(12) United States Patent
Yifrach et al.

(10) Patent No.: US 11,112,271 B2
(45) Date of Patent: Sep. 7, 2021

(54) METHOD OF CALIBRATING A COMPUTERIZED LEVELING OFFSET METER

(71) Applicant: ISRAEL AEROSPACE INDUSTRIES LTD., Lod (IL)

(72) Inventors: Aharon Yifrach, Ashkelon (IL); Roey Zuitlin, Kfar Ben-Nun (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 378 days.

(21) Appl. No.: 16/332,342

(22) PCT Filed: Sep. 24, 2017

(86) PCT No.: PCT/IL2017/051065
§ 371 (c)(1),
(2) Date: Mar. 11, 2019

(87) PCT Pub. No.: WO2018/055620
PCT Pub. Date: Mar. 29, 2018

(65) Prior Publication Data
US 2019/0234758 A1    Aug. 1, 2019

(30) Foreign Application Priority Data

Sep. 25, 2016   (IL) .......................................... 248032

(51) Int. Cl.
*G01C 9/32*  (2006.01)
*G01C 25/00*  (2006.01)
*G01V 13/00*  (2006.01)

(52) U.S. Cl.
CPC ............... *G01C 25/00* (2013.01); *G01C 9/32* (2013.01); *G01V 13/00* (2013.01)

(58) Field of Classification Search
CPC ... G01C 9/26; G01C 9/32; G01C 9/36; G01C 2009/066
(Continued)

(56) References Cited

U.S. PATENT DOCUMENTS 4,942,668 A    7/1990 Franklin
4,993,162 A *  2/1991 Scholian .................. G01C 9/20
                                              33/366.16
(Continued)

FOREIGN PATENT DOCUMENTS

CN    103837126 A    6/2014
FR    2 979 022 A1   2/2013
(Continued)

*Primary Examiner* — George B Bennett
(74) *Attorney, Agent, or Firm* — Oliff PLC (57) ABSTRACT

A method of calibrating a levelling offset meter (LOM) for calculating the angular offset between a plane parallel to the LOM and a predetermined reference plane, the LOM comprises a bull's eye spirit level having a bubble and a processor coupled to an image, comprising: capturing, by the imager, a plurality of images of the spirit level associated with a respective plurality of known angular offsets; calculating in respect of each image a pixel distance from the bubble center to a predetermined zero offset pixel, thereby obtaining a plurality of pixel distances, each pixel distance associated with a known angular offset; fitting a function to a plurality of pairs of values, each pair of values comprising a pixel distance and its associated known angular offset; and storing the function in a memory.

12 Claims, 7 Drawing Sheets

(58) Field of Classification Search
USPC .......................... 33/303, 366.11, 366.23, 390
See application file for complete search history.

(56) References Cited

U.S. PATENT DOCUMENTS

| | | | |
|---|---|---|---|
| 5,101,570 A | 4/1992 | Shimura | |
| 5,111,039 A * | 5/1992 | Froning | G01C 9/36 |
| | | | 250/231.1 |
| 5,180,986 A | 1/1993 | Swartz et al. | |
| 5,794,355 A * | 8/1998 | Nickum | G01C 9/06 |
| | | | 33/366.16 |
| 5,953,116 A * | 9/1999 | Ohtomo | G01C 15/00 |
| | | | 356/249 |
| 6,248,989 B1 * | 6/2001 | Ohishi | G01C 9/06 |
| | | | 250/205 |
| 6,343,422 B1 * | 2/2002 | Takahashi | G01C 9/06 |
| | | | 33/366.16 |
| 6,647,634 B2 | 11/2003 | Yang et al. | |
| 6,776,035 B2 | 8/2004 | Wijeyesekera et al. | |
| 6,993,849 B1 | 2/2006 | Campbell et al. | |
| 7,497,021 B2 * | 3/2009 | Perchak | G01C 9/06 |
| | | | 33/366.16 |
| 7,818,891 B2 * | 10/2010 | Roemhild | G01C 9/24 |
| | | | 33/366.16 |
| 9,631,925 B2 * | 4/2017 | Wang | G01C 9/32 |
| 2010/0283840 A1 | 11/2010 | Belenkii et al. | |
| 2012/0116711 A1 | 5/2012 | Bruns et al. | |
| 2019/0361145 A1 * | 11/2019 | Minarovic | G01C 15/06 |

FOREIGN PATENT DOCUMENTS

| | | |
|---|---|---|
| JP | S60-252215 A | 12/1985 |
| JP | 2004-361372 A | 12/2004 |
| JP | 2013-250189 A | 12/2013 |
| KR | 1020150024080 A | 3/2015 |
| WO | 2016/151573 A1 | 9/2016 |
| WO | 2016/151574 A1 | 9/2016 |

* cited by examiner

METHOD OF CALIBRATING A COMPUTERIZED LEVELING OFFSET METER

TECHNICAL FIELD

The presently disclosed subject matter relates to a computerized digital levelling offset meter and, more particularly, to calibrating a computerized digital levelling offset meter.

BACKGROUND

In several fields of application the measurement of the angular offset between two planes is important. Leveling meters such as the spirit level, consisting of a bubble trapped in a liquid and sealed in a clear glass or plastic enclosure, are typically used to provide a visual indication of levelness. A bull's eye level, in which the enclosure is typically disc shaped with a slightly convex upper surface, is a particular form of spirit level used to measure levelness in two dimensions. e.g. pitch and roll. Such devices may come with an inscribed scale mark which can show the misalignment at a resolution of up to one degree. However, these instruments provide only visual indication of relative levelness, for example to align devices and structures to a horizontal or vertical plane, and are not suitable for applications requiring a reliable determination of actual angular offset in fractions of degrees. MEMS type inclinometers (such as Analog Devices ADIS162097) can provide such accuracies but at high cost of several thousands of dollars.

Problems of reliably determining an angular offset with respect to one or more planes have been recognized in the conventional art and various techniques have been developed to provide solutions, for example:

U.S. Pat. No. 4,942,668 discloses a digital inclinometer for detecting the angular orientation of a structure includes a rotatable encoding disk on which is mounted a horizontal tilt sensor. The inclinometer electronically measures, by angular indices on the encoding disk, the difference between the angular orientation of the device and a horizontal orientation. In another embodiment, the encoding disk is rotated by a stepper motor and the number of steps are electronically counted to determine the angular orientation. The inclinometer has a digital display.

U.S. Pat. No. 5,180,986 discloses a two axis sensor is provided for detecting angular movement relative to either of two mutually perpendicular axes. The device includes a two-axis sensor comprising an upwardly directed, spherically shaped common electrode, an upwardly directed spherically shaped insulating member uniformly spaced from the common electrode to form a cavity therebetween, the common electrode and the insulating member being sealed to each other about respective peripheries thereof, with a dielectric fluid contained in the cavity, a plurality of detecting electrodes provided on an underside of the insulating member, the detecting electrodes formed by a selectively applied conductive surface coating on the underside, and means for detecting variations in capacitance proportional to movement of the sensor relative to each of two mutually perpendicular axes by reason of movement of the dielectric fluid within the cavity.

International Patent Application No. PCT/IL2016/050269 discloses a leveling offset meter (LOM) that includes a spirit level having one or more bubbles adapted for movement in two mutually orthogonal planes. An imager configured to image the one or more bubbles and store corresponding image data. A processor/CPU coupled to the imager and responsive to the image data for determining respective angular offsets to the vertical of the bubble in two mutually orthogonal horizontal planes, and means for conveying the angular offsets to a display unit.

The references cited above teach background information that may be applicable to the presently disclosed subject matter. Therefore the full contents of these publications are incorporated by reference herein where appropriate for appropriate teachings of additional or alternative details, features and/or technical background.

GENERAL DESCRIPTION

According to one aspect of the presently disclosed subject matter, there is provided a processor configured to execute a series of operations for calibrating a levelling offset meter (LOM) for calculating the angular offset between a plane parallel to the LOM and a predetermined reference plane, the LOM comprising a bull's eye spirit level having a bubble therein, the processor operatively coupled to an imager configured to image the spirit level, the series of operations comprising: calculating, in respect of each of a plurality of images of the spirit level image, a pixel distance from the bubble center to a predetermined zero offset pixel, thereby obtaining in respect of the plurality of images a plurality of pixel distances, each pixel distance associated with a known angular offset, each image being captured by the imager while the LOM is oriented with respect to the predetermined reference plane at the known angular offset associated with the image; fitting a function to a plurality of pairs of values, each pair of values comprising a pixel distance and its associated known angular offset, said function being useable to map a new pixel distance obtained in respect of a new image to a corresponding angular offset between a plane parallel to the LOM and the predetermined reference plane; and storing the function in a memory.

In addition to the above features, the processor according to this aspect of the presently disclosed subject matter can comprise one or more of features (i) to (ix) listed below, in any desired combination or permutation which is technically possible:

(i) the pixel distance comprises an x-pixel distance and a y-pixel distance;

(ii) the angular offset comprises a pitch offset and a roll offset;

(iii) a first function is fit to a first plurality of pairs of values, each pair of values in the first plurality of pairs of values comprising an x-pixel distance and a corresponding pitch offset;

(iv) a second function is fit to a second plurality of pairs of values, each pair of values in the second plurality of pairs of values comprising a y-pixel distance and a corresponding roll offset;

(v) the zero offset pixel is determined by using a plurality of images of the bubble captured by the imager whilst the levelling offset meter is rotated along a rotation axis orthogonal to the predetermined reference plane;

(vi) the plurality of images are captured at a respective plurality of degrees of rotation;

(vii) for each image, a first pair of values indicative of the pixel coordinates of the pixel closest to the bubble center is determined;

(viii) a second pair of values is determined based on a plurality of first pairs of values, and indicative of a midpoint of all first pairs of values; and (ix) the pixel having pixel coordinates corresponding to the second pair of values is selected as the zero offset pixel.

According to another aspect of the presently disclosed subject matter, there is provided a method of calibrating a levelling offset meter (LOM) for calculating the angular offset between a plane parallel to the LOM and a predetermined reference plane, the LOM comprising a bull's eye spirit level having a bubble therein, and a processor operatively coupled to an imager, the method comprising: capturing, by the imager, a plurality of images of the spirit level, the plurality of images associated with a respective plurality of known angular offsets, each image being captured while the LOM is oriented with respect to the predetermined reference plane at the known angular offset associated with the image; calculating, by the processor, in respect of each image, a pixel distance from the bubble center to a predetermined zero offset pixel, thereby obtaining in respect of the plurality of images a plurality of pixel distances, each pixel distance associated with a known angular offset; fitting, by the processor, a function to a plurality of pairs of values, each pair of values comprising a pixel distance and its associated known angular offset, said function being useable to map a new pixel distance obtained in respect of a new image to a corresponding angular offset between a plane parallel to the LOM and the predetermined reference plane; and storing the function in a memory.

This aspect of the disclosed subject matter can comprise one or more of features (i) to (ix) listed above with respect to the processor, mutatis mutandis, in any desired combination or permutation which is technically possible.

According to another aspect of the presently disclosed subject matter, there is provided a computer program product comprising a program of instructions readable by a computer, the program of instructions for executing a method of calibrating a levelling offset meter (LOM) for calculating the angular offset between a plane parallel to the LOM and a predetermined reference plane, the LOM comprising a bull's eye spirit level having a bubble therein, and a processor operatively coupled to an imager, the method comprising: capturing, by the imager, a plurality of images of the spirit level, the plurality of images associated with a respective plurality of known angular offsets, each image being captured while the LOM is oriented with respect to the predetermined reference plane at the known angular offset associated with the image; calculating, by the processor, in respect of each image, a pixel distance from the bubble center to a predetermined zero offset pixel, thereby obtaining in respect of the plurality of images a plurality of pixel distances, each pixel distance associated with a known angular offset; fitting, by the processor, a function to a plurality of pairs of values, each pair of values comprising a pixel distance and its associated known angular offset, said function being useable to map a new pixel distance obtained in respect of a new image to a corresponding angular offset between a plane parallel to the LOM and the predetermined reference plane; and storing the function in a memory.

This aspect of the disclosed subject matter can comprise one or more of features (i) to (ix) listed above with respect to the system, mutatis mutandis, in any desired combination or permutation which is technically possible.

According to another aspect of the presently disclosed subject matter there is provided a non-transitory program storage device readable by a computer, tangibly embodying computer readable instructions executable by the computer to perform a method of calibrating a levelling offset meter (LOM) for measuring the angular offset between a plane parallel to the LOM and a predetermined reference plane, the LOM comprising a bull's eye spirit level having a bubble therein, and a processor operatively coupled to an imager, the method comprising: capturing, by the imager, a plurality of images of the spirit level, the plurality of images associated with a respective plurality of known angular offsets, each image being captured while the LOM is oriented with respect to the predetermined reference plane at the known angular offset associated with the image; calculating, by the processor, in respect of each image, a pixel distance from the bubble center to a predetermined zero offset pixel, thereby obtaining in respect of the plurality of images a plurality of pixel distances, each pixel distance associated with a known angular offset; fitting, by the processor, a function to a plurality of pairs of values, each pair of values comprising a pixel distance and its associated known angular offset, said function being useable to map a new pixel distance obtained in respect of a new image to an angular offset between a plane parallel to the LOM at the time of capture of the new image and the predetermined reference plane; and storing the function in a memory.

This aspect of the disclosed subject matter can comprise one or more of features (i) to (ix) listed above with respect to the system, mutatis mutandis, in any desired combination or permutation which is technically possible.

Among advantages of certain embodiments of the presently disclosed subject matter is the capability of accurately measuring angular offsets to fractions of degrees.

Among further advantages of certain embodiments of the presently disclosed subject matter is the capability of accurately measuring angular offsets to fractions of degrees using relatively low-cost hardware compared to the hardware of the prior art.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "calculating", "selecting". "capturing", "translating". "mapping", "determining". "storing". "fitting" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the processing unit disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes or by a general-purpose computer specially configured for the desired purpose by a computer program stored in a non-transitory computer-readable storage medium.

The term "angular offset" used in this patent specification should be expansively construed to cover a two-angle (e.g. pitch and roll) angular distance between two non-parallel planes.

The term "predetermined reference plane" used in this patent specification should be expansively construed to cover the base plane (or any plane parallel thereto) in respect of which all angular offsets are calculated.

The term "horizontal plane" used in this patent specification should be expansively construed to cover the plane (or any plane parallel thereto) perpendicular to the Earth's local gravitational force.

The term "pixel distance" used in this patent specification should be expansively construed to cover a distance (in pixels) between two given pixels in an image, and, unless otherwise noted, should be understood as simultaneously comprising both an x-pixel component and a v-pixel component, corresponding to the horizontal distance and vertical distance between the two pixels, respectively.

The term "calibrate", and modifications thereof, used in this patent specification should be expansively construed to cover generating a function (including two or more separate functions) for translating a pixel distance to a corresponding angular offset.

Embodiments of the presently disclosed subject matter are not described with reference to any particular programming language. It will be appreciated that a variety of programming languages may be used to implement the teachings of the presently disclosed subject matter as described herein.

Figure 1:
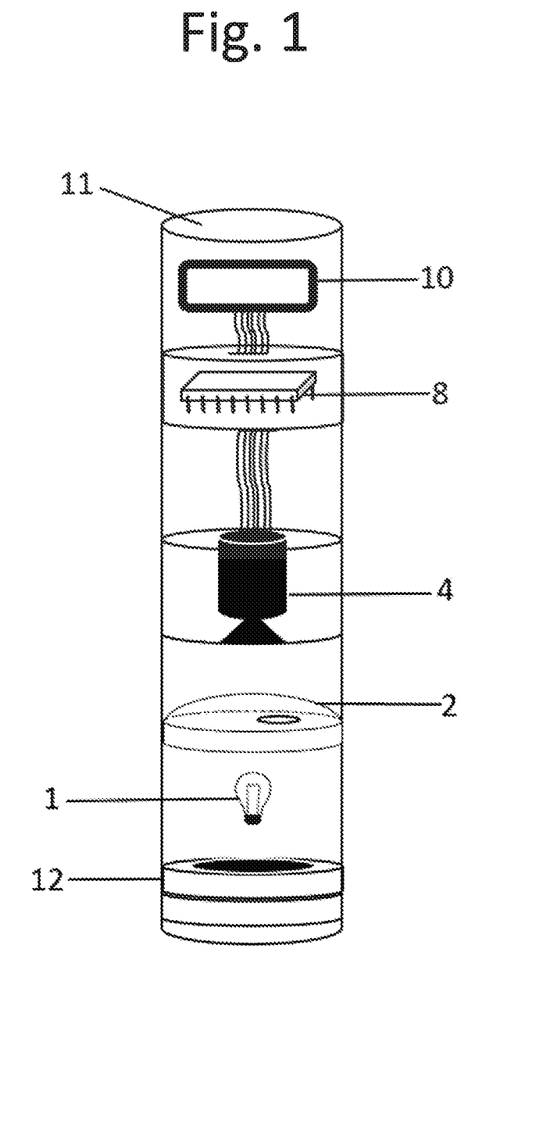
FIG. 1 illustrates a schematic diagram of a levelling offset meter (LOM) in accordance with certain embodiments of the presently disclosed subject matter.

Bearing this in mind, attention is drawn to FIG. 1 illustrating a transparent side view of a levelling offset meter (LOM) (11) in accordance with certain embodiments of the presently disclosed subject matter. The illustrated LOM includes a bull's eye spirit level (2) comprising a bubble and surrounding fluid, a light source (1) adapted to illuminate the spirit level, an imager (4) (e.g. a camera) adapted to capture digital images of the spirit level including the bubble and at least some of the surrounding fluid, a processing unit (8) configured to execute a series of computer-readable instructions including, inter alia, instructions for processing images captured by imager (4), as will be further detailed below with reference to FIGS. 3, 6 and 8.

LOM (11) further includes a display unit (10) configured to output data including, inter alia, angular offsets calculated by processing unit (8), and a power supply (12) configured to supply power to one or more components of LOM (11). In certain embodiments, the LOM can further include an input unit (not shown) configured to accept user input.

Figure 2:
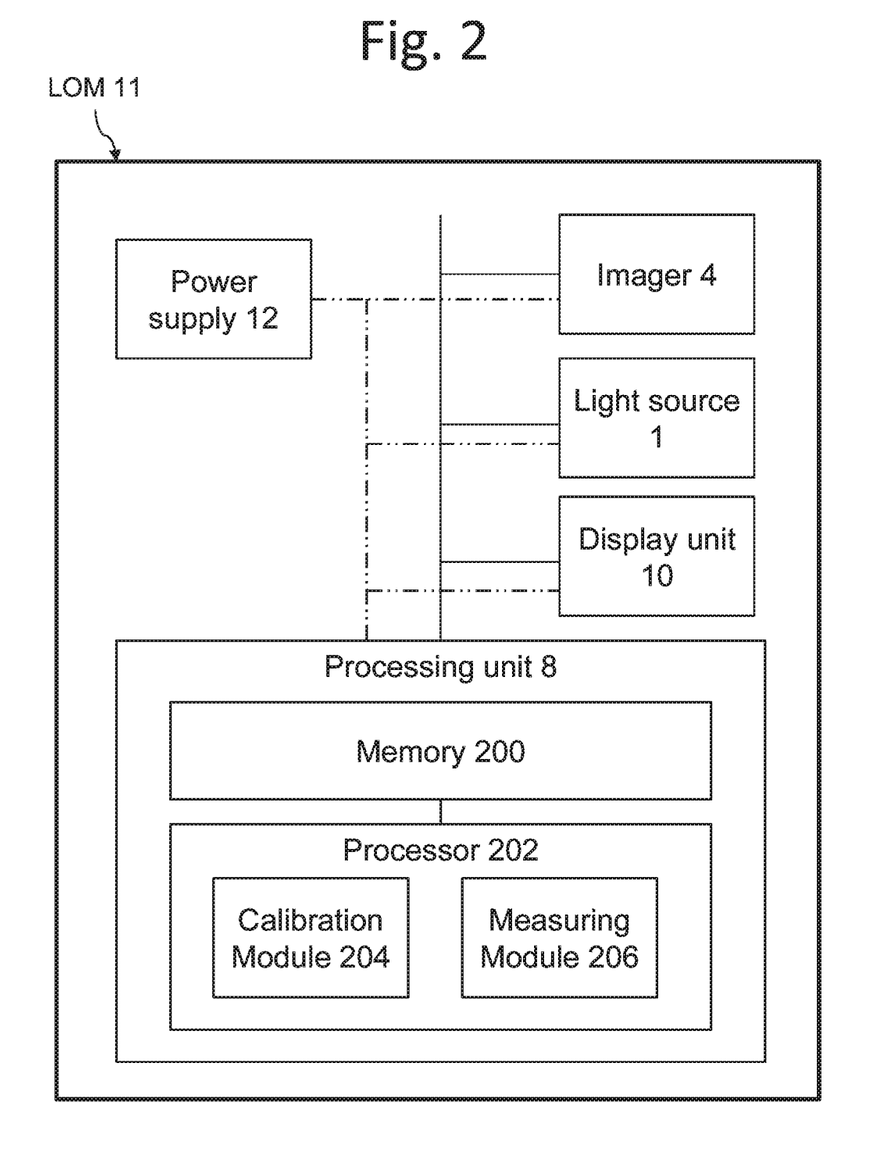
FIG. 2 illustrates a functional block diagram of a processing unit of a LOM in accordance with certain embodiments of the presently disclosed subject matter.

FIG. 2 illustrates a generalized functional block diagram of LOM (11) in accordance with certain embodiments of the presently disclosed subject matter. Processing unit (8) is operably coupled to each of light source (1), imager (4), display unit (10). In certain embodiments, processing unit (8) may also be operably coupled to an input unit (not shown). In certain embodiments, processing unit (8) comprises a processor (202) operatively coupled to a memory (200). Processor (202) can be, e.g., a microprocessor, a microcontroller, integrated circuit, system-on-a-chip, or any other computing device or module. Memory (200) can be, e.g., volatile or non-volatile computer-readable memory configured to store data including, inter alia, configuration settings, calibration parameters and/or images (including data related thereto and/or derived therefrom).

As will be further detailed with reference to FIGS. 3, 6 and 8, processor (202) can be configured to execute several functional modules in accordance with computer-readable instructions implemented on a non-transitory computer-readable storage medium. Such functional modules are referred to hereinafter as comprised in the processor. In certain embodiments, processor (202) can comprise a calibration module (204) configured to calibrate the LOM (11), as will be further detailed below with reference to FIGS. 3 and 6. Processor (202) can further comprise a measuring module (206) configured to calculate angular offsets, as will be further detailed below with reference to FIG. 8.

It is noted that the teachings of the presently disclosed subject matter are not bound by the LOM described with reference to FIGS. 1-2. Equivalent and/or modified functionality can be consolidated or divided in another manner and can be implemented in any appropriate combination of software with firmware and/or hardware and executed on a suitable device.

Figure 3:
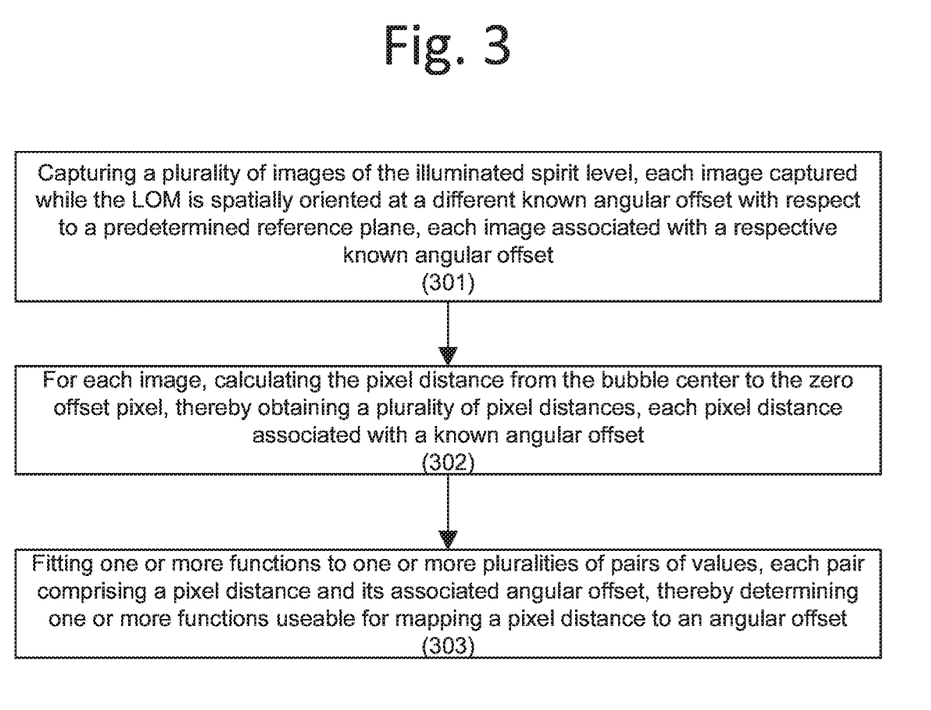
FIG. 3 illustrates a generalized flow-chart of calibrating a LOM in accordance with certain embodiments of the presently disclosed subject matter.

FIG. 3 illustrates a generalized flow chart of calibrating the LOM in accordance with certain embodiments of the presently disclosed subject matter. In the description that follows, reference is made to calibrating the LOM for calculating angular offsets in two dimensions, i.e. pitch and roll, however those skilled in the art will readily appreciate that the LOM can also be calibrated to measure a one-dimensional angular offset, i.e. either pitch or roll, by ordinary modification of the steps detailed below.

In certain embodiments, processing unit (8) activates light source (1) thereby causing the spirit level (2) to be illuminated and, simultaneously or concurrently, activates the imager (4) causing the imager to begin capturing (301) a plurality of images of the illuminated spirit level. Each image is captured while the LOM is spatially oriented at a different known angular offset (e.g. pitch and roll offset) with respect to the predetermined reference plane, and each image being informative of the 2D position of the bubble within the image while the LOM is oriented at the respective angular offset. Each image is then associated with the respective angular offset and stored in the memory.

In certain embodiments, the known angular offsets in respect of which images are captured may be predefined. For example, the LOM can be configured to display. e.g. on display unit (10), in turn, a series of angular offsets. After displaying an angular offset, the LOM can be configured to wait for user input indicating that the LOM has been oriented at the desired angular offset. Upon receiving such user input, the LOM can be configured to capture an image of the spirit level, and associate the image with the corresponding angular offset, and thereafter display the next desired angular offset.

In other embodiments, the known angular offsets may be selected by a user. For example, the LOM may be configured to receive user input indicative of the current angular offset at which the LOM is oriented, after which an image is captured and associated with the corresponding angular offset.

In certain embodiments, the predetermined reference plane can be the horizontal plane. In certain embodiments, the predetermined reference plane can be any other plane defined by a user, as will be detailed below with reference to FIG. 6.

In certain embodiments, the LOM can be oriented at different known angular offsets, e.g. by setting the LOM on a moveable table or surface which can be tilted at various degrees of pitch and/or roll and which allows for precise measuring of the tilt angle(s), such as the universal tilting table model no. UTT-50 sold by Kay Cee Machine Tools of Haryana, India. Alternatively, the tilt angle(s) of the moveable table or surface may also be reliably measured using a separate measuring instrument or device such as the celestial compass disclosed in international patent application no. PCT/IL2016/050272.

Next, processing unit (8), e.g. calibration module (204), determines, for each image, the image coordinates (e.g. the x, y pixel coordinates) of the pixel corresponding to the center of the bubble (referred to herein as the "bubble center"), and calculates (302) the pixel distance from the bubble center to a predetermined second pixel (referred to herein as the "zero offset pixel"). A plurality of pixel distances are thus obtained in respect of the plurality of images, each pixel distance associated with a corresponding angular offset (being the angular offset associated with the image in respect of which the pixel distance is obtained).

The pixel corresponding to the center of the bubble can be, e.g. the pixel closest to the geometrical center of the bubble. In certain embodiments, the pixel coordinates of the bubble center can be determined as follows. In a prior configuration stage or during calibration, imager (4) captures at least two images of the bull's eye level, each image captured while the bubble is on opposite sides of the levelling meter. For example, in the first image the bubble is completely in the left half of the image while in the second image the bubble is completely in the right half of the image (this can be achieved e.g. by tilting the LOM first to one side, capturing the image, tilting to the opposite side, and capturing another image. Each image therefore contains a first sub-image part (the "bubble" part) depicting the surrounding fluid and the bubble, and a second sub-image part depicting the surrounding fluid only with no bubble (the "bubble-less" part). The bubble-less parts of each image are then merged together to produce a new image in which the entire image depicts surrounding fluid only and no bubble. This image is stored in memory (e.g. as configuration settings) and referred to as the bubble-less image. For each image in respect of which a bubble center is to be determined, the image is first compared to the stored bubble-less image in order to isolate the blob representing the bubble from the background. The height and width (in the image domain) of the blob is determined, and the center is calculated. The pixel closest to the center is then identified.

As will be detailed below with reference to FIG. 6, the zero offset pixel is the pixel which is known (or is determined) to correspond to the bubble center when the LOM is oriented level (i.e. parallel) to the predetermined reference plane.

In certain embodiments, calculating the pixel distance between two pixels includes separately calculating the horizontal, or x-pixel, component and the vertical, or y-pixel, component.

Figure 4:
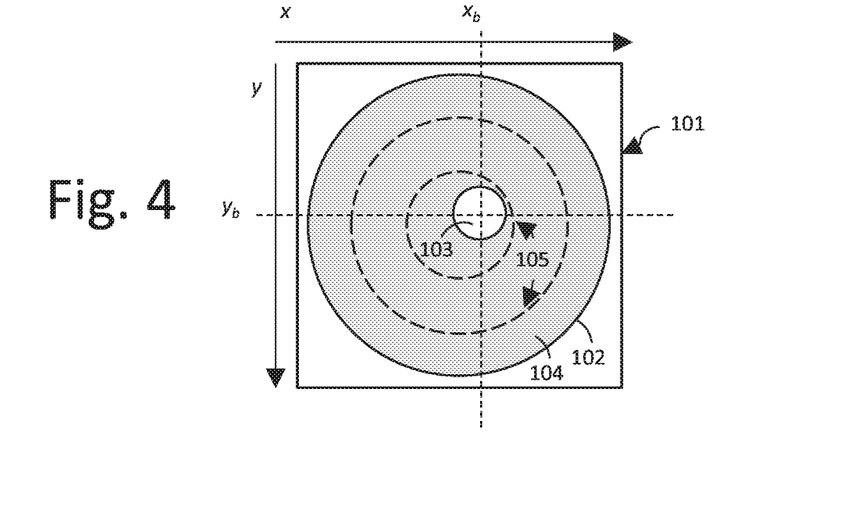
FIG. 4 illustrates an image captured by the imager of a LOM in accordance with certain embodiments of the presently disclosed subject matter.

FIG. 4 illustrates, by way of example, an image (101) captured by imager (4) and depicting a top-down view of the spirit level (102) including surrounding fluid (104), bubble (103) and reference marks (105) (included for illustrative purposes). Image (101) is assumed to be captured while the LOM is oriented at a particular angular offset $\theta_p$, $\psi_p$ with respect to the predetermined reference plane, and therefore associated with angular offset $\theta_p$, $\psi_p$ ($\theta$ and $\psi$ are used herein to denote pitch and roll, respectively). FIG. 4 further illustrates the bubble center of bubble (103), denoted as having pixel coordinates $x_b$, $y_b$.

Figure 5:
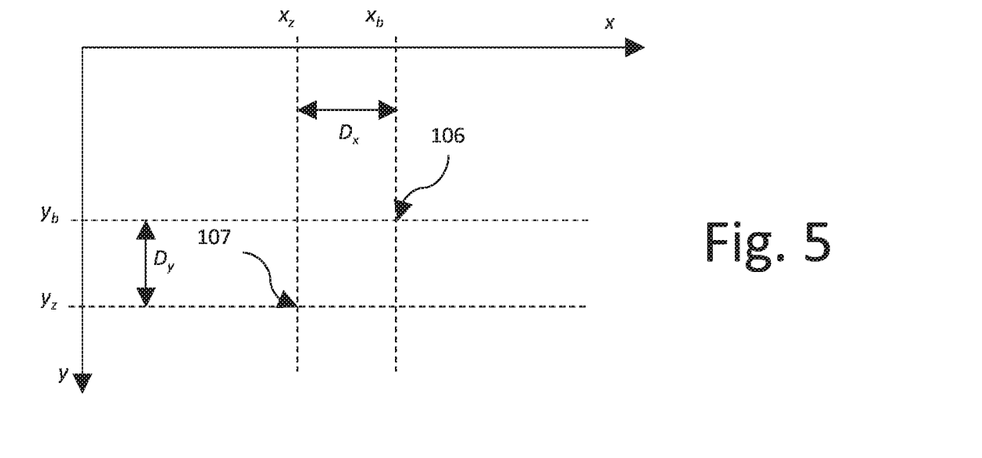
FIG. 5 illustrates a pixel distance in accordance with certain embodiments of the presently disclosed subject matter.

FIG. 5 illustrates, by way of example, a graph of x and y pixel coordinates in which the horizontal axis represents x-pixel coordinates and the vertical axis represents y-pixel coordinates. FIG. 5 further illustrates the pixel distance (comprised of horizontal component $D_x$, and vertical component $D_y$) between two pixels in image (101) of FIG. 4, namely a first pixel (106) having pixel coordinates $x_b$, $y_b$ and corresponding to the bubble center, and a second pixel (107) having pixel coordinates $x_z$, $y_z$ and corresponding to the zero offset pixel (selected arbitrarily for the purposes of this example). Since image (101) is associated with angular offset $\theta_p$, $\psi_p$, the horizontal distance $D_x$ is therefore determined to correspond to pitch offset $\theta_p$ with respect to the predetermined reference plane, and the vertical distance $D_y$ is determined to correspond to roll offset $\psi_p$ with respect to the same predetermined reference plane. Thus, for N images, each associated with a different angular offset, 2N pairs of values can be obtained, in which each pair of values comprises either a horizontal or vertical distance and its corresponding pitch or roll offset, respectively.

Returning now to FIG. 3, after having obtained a plurality of pixel distances associated with a respective plurality of known angular offsets, processing unit (8), e.g. calibration module (204), using, e.g., a fitting algorithm, fits (303) a function to a plurality of pairs of values, where each pair of values comprises a first value corresponding to a pixel distance associated with a given image, and a second value corresponding to the known angular offset associated with the same image. In certain embodiments, fitting a function includes separately fitting a first function $f(x)$ to a first plurality of pairs of values, the pairs of values in the first plurality constituted by a horizontal pixel distance and a corresponding pitch offset, and fitting a second function $f(y)$ to a second plurality of pairs of values, the pairs of values in the second plurality constituted by a vertical pixel distance and a corresponding roll offset. It should be noted that a variety of methods exist for fitting a function to pairs of values using one or more fitting algorithms known to persons skilled in the art.

The resulting function is then stored in the memory and is useable as calibration parameters for the LOM, defining a mapping between pixel distances in images captured by the imager and corresponding angular offsets between the LOM and the predetermined reference plane. Using the calibration parameters, processing unit (8) can be configured to calculate the precise angular offset between the LOM and the predetermined reference plane at any given orientation of the LOM, as further detailed below with reference to FIG. 8.

Figure 6:
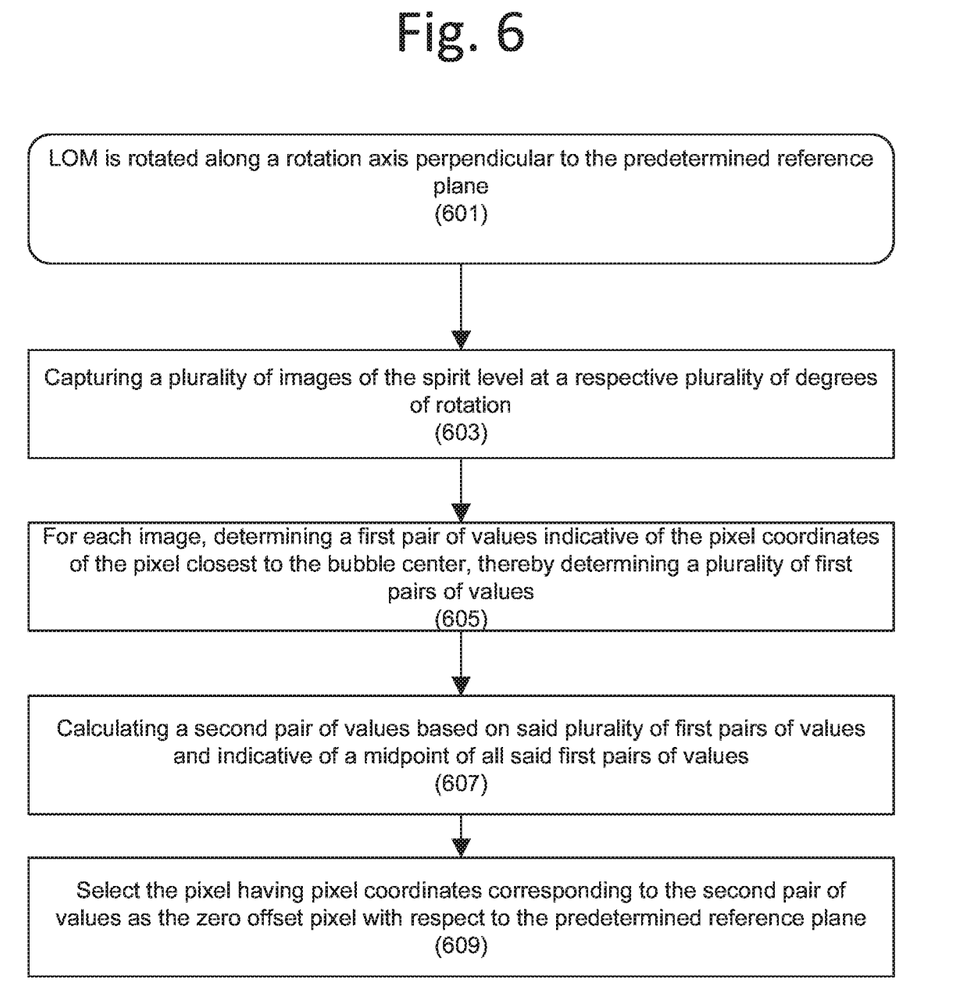
FIG. 6 illustrates a generalized flow chart of determining a zero offset pixel in accordance with certain embodiments of the presently disclosed subject matter.

FIG. 6 illustrates a generalized flow chart of determining the zero offset pixel in respect of a predetermined reference plane in accordance with certain embodiments of the presently disclosed subject matter. In certain embodiments, the LOM is rotated (601) the LOM along a rotation axis perpendicular to the predetermined reference plane (which may in fact be any plane selected by the user), for example a user places the LOM on a planar surface parallel to the predetermined reference plane, and rotates the LOM 360 degrees. During rotation of the LOM, imager (4) captures (603) a plurality of images of the illuminated spirit level at different rotation angles between 0-360 degrees. The plurality of images can be stored, e.g. in the memory of the processing unit.

Figure 7A:
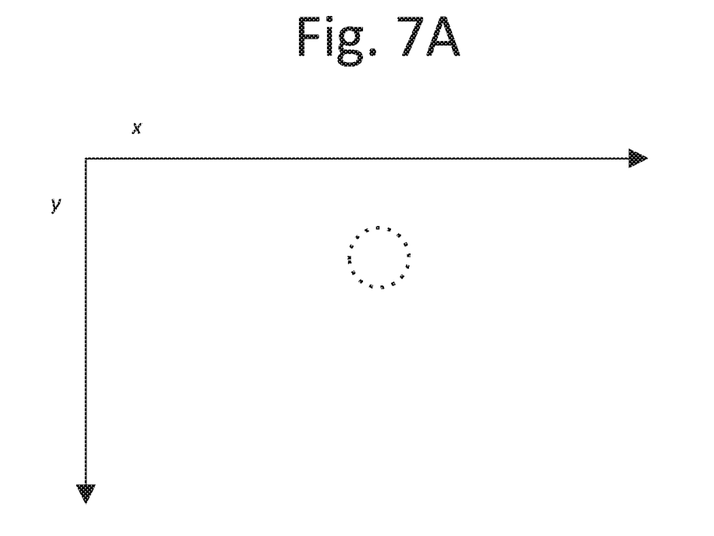
FIG. 7A illustrates a set of data points corresponding to bubble centers of a set of images in accordance with certain embodiments of the presently disclosed subject matter.

Next, using image processing techniques known to persons skilled in the art, processing unit (8), e.g. calibration module (204), determines (605), in respect of each image, a first pair of values indicative of the pixel coordinates of the bubble center, thereby determining a plurality of first pairs of values in respect of the plurality of images. FIG. 7A conceptually illustrates, by way of a scatter plot, a set of data points corresponding to a set of images captured during LOM rotation, each point identifying the bubble center in a given image in the set of images.

Figure 7B:
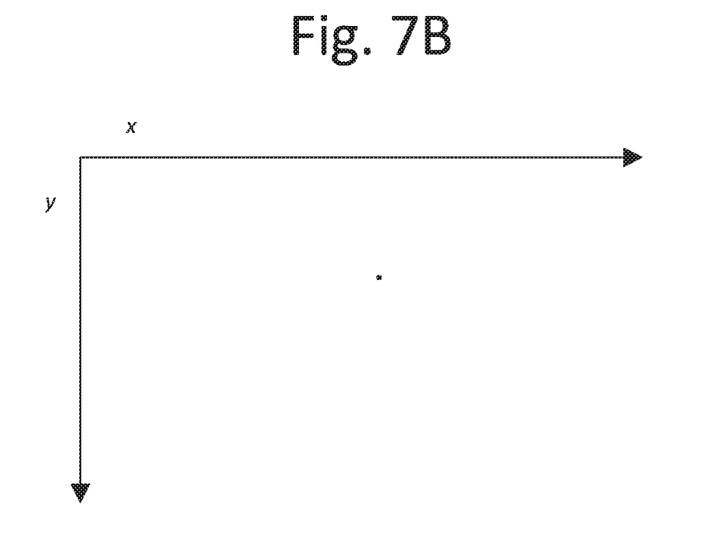
FIG. 7B illustrates a mid-point of the set of data points shown in FIG. 7A in accordance with certain embodiments of the presently disclosed subject matter.

Next, processing unit (8), e.g. calibration module (204), calculates (607) a second pair of values based on the plurality of first pairs of values and indicative of a midpoint of all the first pairs of values. Methods exist for deriving a n-dimensional mid-point of a set of n-dimensional values and are known to persons skilled in the art. For example, a fitting algorithm can be used. FIG. 7B conceptually illustrates a single data point which can represent the mid-point of all the data points shown in FIG. 7A.

Next, processing unit (8), e.g. calibration module (204), selects (609) the pixel having pixel coordinates corresponding to the second pair of values, and uses the selected pixel as the zero offset pixel with respect to the predetermined reference plane. By way of example, if the mid-point was calculated as (100, 25), the pixel having x, y coordinates 100, 25 would be selected as the zero offset pixel.

In certain embodiments, the LOM may calibrated prior to first use. e.g. by the manufacturer. In certain other embodiments, the LOM may be calibrated at any time, e.g. by a user. In such a case, the LOM may include an input unit (e.g. one or more buttons, communications interface (e.g. USB) for connection to an external device, etc.) operably to accept user commands, including a command to execute a calibration operation. In certain embodiments, in response to receiving a command to execute a calibration operation, processing unit can generate data for output to the display unit. Such data can include, e.g. instructions for rotating the LOM, values indicative of one or more known angular offsets at which the user should orient the LOM during the calibration and/or prompts to enter such values, etc.

In certain embodiments, allowing a user the flexibility of calibrating the LOM at any time can be desirous for a number of reasons, including, e.g. to define or redefine the predetermined reference plane, to mitigate problems that may arise from time to time which may cause the LOM to provide inaccurate results, etc. Such problems can arise, for example, due to lighting changes in the appearance of the illuminated spirit level (e.g. due to a change in power supply or deterioration of the light source), which in turn can affect the image processing. Other problems can arise, for example, from mechanical shock which may lead to a slight change in the relative position or orientation of the spirit level with respect to the camera, and/or extreme temperatures which may lead to a deformation of the bubble at different orientations.

Figure 8:
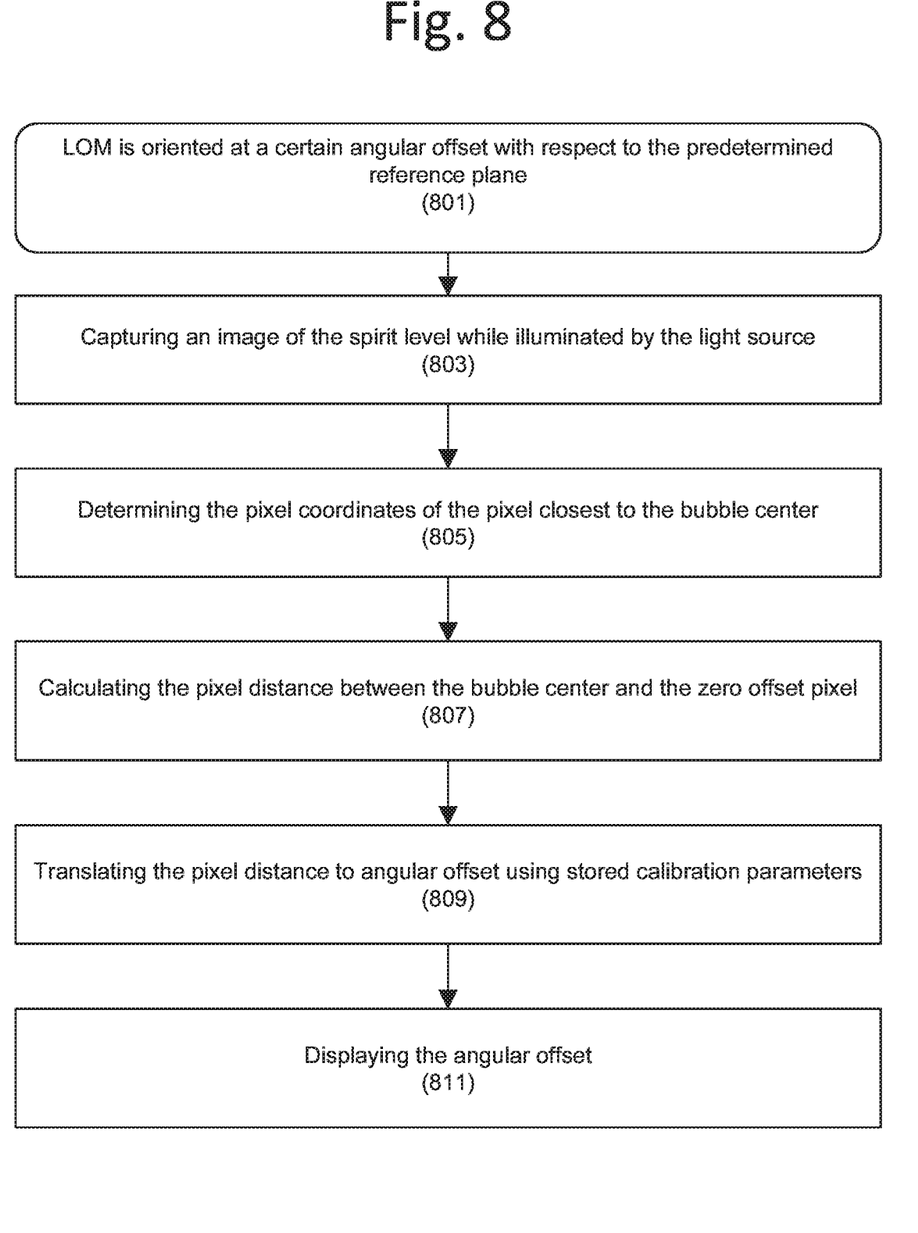
FIG. 8 illustrates a generalized flow chart of calculating an angular offset using the LOM in accordance with certain embodiments of the presently disclosed subject matter.

FIG. 8 illustrates a generalized flow chart of calculating one or more angular offsets in accordance with certain embodiments of the presently disclosed subject matter.

In certain embodiments, user orients (801) the LOM parallel to a plane (e.g. by placing it on a planar surface) which is angled with respect to the predetermined reference plane at a certain angular offset which the user is desirous of measuring, at which point processing unit (8) activates light source (1) thereby causing the spirit level (2) to be illuminated and, simultaneously or concurrently, activates the imager (4) causing the imager to capture (803) an image of the spirit level. The image can be stored, e.g. in the memory (200). In certain embodiments, the activation by processing unit (8) can be in response to a user input. In other embodiments, processing unit (8) can be configured to continuously activate the light source and imager in order to calculate the most current angular offset of the LOM without requiring any particular user input.

Processing unit (8), e.g. measuring module (206), processes the image by determining (805) the pixel coordinates of the bubble center (e.g. using known image processing techniques) and calculating (807) the pixel distance between the bubble center and the predetermined zero offset pixel (which would have been determined previously during calibration and stored in the memory).

Using the calibration parameters obtained from the memory and useable to map pixel distances in images captured by the imager to angular offsets, processing unit (8), e.g. measuring module (206), translates (809) the calculated pixel distance to a corresponding angular offset. Processing unit (8) then displays (811) the corresponding angular offset on display unit (11).

It is noted that the teachings of the presently disclosed subject matter are not bound by the flow charts illustrated in FIGS. 3, 6 and 8; in some cases the illustrated operations can occur out of the illustrated order. It is also noted that whilst the flow chart is described with reference to certain elements of LOM (10), this is by no means binding, and in some cases the operations can be performed by elements other than those described herein.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of calibrating a levelling offset meter (LOM) for calculating the angular offset between a plane parallel to the LOM and a predetermined reference plane, the LOM comprising a bull's eye spirit level having a bubble therein, and a processor operatively coupled to an imager, the method comprising:
   capturing, by the imager, a plurality of images of the spirit level, the plurality of images associated with a respective plurality of known angular offsets, each image being captured while the LOM is oriented with respect to the predetermined reference plane at the known angular offset associated with the image;
   calculating, by the processor, in respect of each image, a pixel distance from the bubble center to a predetermined zero offset pixel, thereby obtaining in respect of the plurality of images a plurality of pixel distances, each pixel distance associated with a known angular offset;
   fitting, by the processor, a function to a plurality of pairs of values, each pair of values comprising a pixel distance and its associated known angular offset, said function being useable to map a new pixel distance obtained in respect of a new image to a corresponding angular offset between a plane parallel to the LOM and the predetermined reference plane; and
   storing the function in a memory.

2. The method of claim 1 wherein the pixel distance comprises an x-pixel distance and a y-pixel distance, and wherein the angular offset comprises a pitch offset and a roll offset.

3. The method of claim 2 wherein fitting a function to a plurality of pairs of values comprises fitting a first function to a first plurality of pairs of values and fitting a second function to a second plurality of pairs of values, wherein each pair of values in the first plurality of pairs of values comprises an x-pixel distance and a corresponding pitch offset, and each pair of values in the second plurality of pairs of values comprises a y-pixel distance and a corresponding roll offset.

4. The method of claim 1, wherein the zero offset pixel is determined by:
   capturing, by the imager, a plurality of images of the bubble whilst the levelling offset meter is rotated along a rotation axis orthogonal to the predetermined reference plane, the plurality of images captured at a respective plurality of degrees of rotation;
   for each image, determining, by the processor, a first pair of values indicative of the pixel coordinates of the pixel closest to the bubble center, thereby determining a plurality of first pairs of values corresponding to a respective plurality of images;
   calculating, by the processor, a second pair of values based on said plurality of first pairs of values and indicative of a midpoint of all said first pairs of values, and
   selecting the pixel having pixel coordinates corresponding to the second pair of values as the zero offset pixel.

5. A processor configured to execute a series of operations for calibrating a levelling offset meter (LOM) for calculating the angular offset between a plane parallel to the LOM and a predetermined reference plane, the LOM comprising a bull's eye spirit level having a bubble therein, the processor operatively coupled to an imager configured to image the spirit level, the series of operations comprising:
   calculating, in respect of each of a plurality of images of the spirit level image, a pixel distance from the bubble center to a predetermined zero offset pixel, thereby obtaining in respect of the plurality of images a plurality of pixel distances, each pixel distance associated with a known angular offset, each image being captured by the imager while the LOM is oriented with respect to the predetermined reference plane at the known angular offset associated with the image;
   fitting a function to a plurality of pairs of values, each pair of values comprising a pixel distance and its associated known angular offset, said function being useable to map a new pixel distance obtained in respect of a new image to a corresponding angular offset between a plane parallel to the LOM and the predetermined reference plane; and
   storing the function in a memory.

6. The processor of claim 5, wherein the pixel distance comprises an x-pixel distance and a y-pixel distance, and wherein the angular offset comprises a pitch offset and a roll offset.

7. The processor of claim 6 wherein fitting a function to a plurality of pairs of values comprises fitting a first function to a first plurality of pairs of values and fitting a second function to a second plurality of pairs of values, wherein each pair of values in the first plurality of pairs of values comprises an x-pixel distance and a corresponding pitch offset, and each pair of values in the second plurality of pairs of values comprises a y-pixel distance and a corresponding roll offset.

8. The processor of claim 5, wherein the processor is configured to determine the zero offset pixel using a plurality of images of the bubble captured by the imager whilst the levelling offset meter is rotated along a rotation axis orthogonal to the predetermined reference plane, the plurality of images captured at a respective plurality of degrees of rotation, by:
   for each image, determining a first pair of values indicative of the pixel coordinates of the pixel closest to the bubble center, thereby determining a plurality of first pairs of values corresponding to a respective plurality of images;
   calculating a second pair of values based on said plurality of first pairs of values and indicative of a midpoint of all said first pairs of values, and
   selecting the pixel having pixel coordinates corresponding to the second pair of values as the zero offset pixel.

9. A computer program product comprising a program of instructions readable by a computer, the program of instructions for executing a method of calibrating a levelling offset meter (LOM) for calculating the angular offset between a plane parallel to the LOM and a predetermined reference plane, the LOM comprising a bull's eye spirit level having a bubble therein, and a processor operatively coupled to an imager, the method comprising:

capturing, by the imager, a plurality of images of the spirit level, the plurality of images associated with a respective plurality of known angular offsets, each image being captured while the LOM is oriented with respect to the predetermined reference plane at the known angular offset associated with the image;

calculating, by the processor, in respect of each image, a pixel distance from the bubble center to a predetermined zero offset pixel, thereby obtaining in respect of the plurality of images a plurality of pixel distances, each pixel distance associated with a known angular offset;

fitting, by the processor, a function to a plurality of pairs of values, each pair of values comprising a pixel distance and its associated known angular offset, said function being useable to map a new pixel distance obtained in respect of a new image to a corresponding angular offset between a plane parallel to the LOM and the predetermined reference plane; and storing the function in a memory.

10. The computer program product of claim 9 wherein the pixel distance comprises an x-pixel distance and a y-pixel distance, and wherein the angular offset comprises a pitch offset and a roll offset.

11. The computer program product of claim 10 wherein fitting a function to a plurality of pairs of values comprises fitting a first function to a first plurality of pairs of values and fitting a second function to a second plurality of pairs of values, wherein each pair of values in the first plurality of pairs of values comprises an x-pixel distance and a corresponding pitch offset, and each pair of values in the second plurality of pairs of values comprises a y-pixel distance and a corresponding roll offset.

12. The computer program product of claim 9, wherein the zero offset pixel is determined by:

capturing, by the imager, a plurality of images of the bubble whilst the levelling offset meter is rotated along a rotation axis orthogonal to the predetermined reference plane, the plurality of images captured at a respective plurality of degrees of rotation;

for each image, determining, by the processor, a first pair of values indicative of the pixel coordinates of the pixel closest to the bubble center, thereby determining a plurality of first pairs of values corresponding to a respective plurality of images;

calculating, by the processor, a second pair of values based on said plurality of first pairs of values and indicative of a midpoint of all said first pairs of values, and selecting the pixel having pixel coordinates corresponding to the second pair of values as the zero offset pixel.

* * * * *